Jan. 4, 1955     Y. CONWELL ET AL     2,698,463
MOLTEN PLASTIC EXTRUSION PROCESS
Filed Nov. 3, 1951
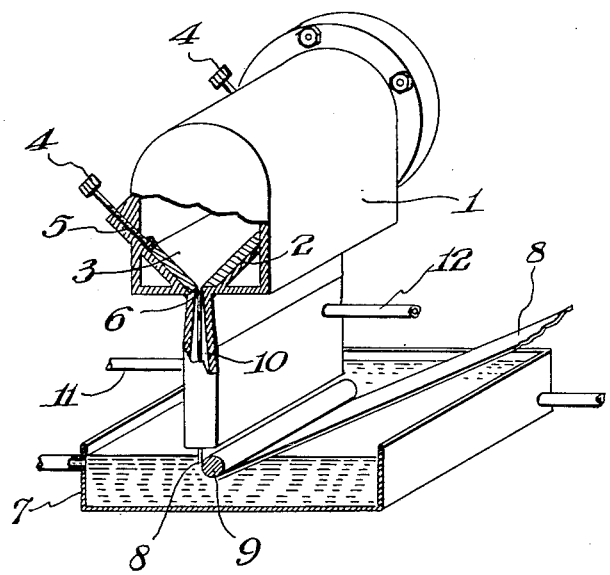
INVENTORS:
YEATES CONWELL,
WARREN F. BUSSE and
VINCENT P. CARACCIOLO
BY
ATTORNEY.

2,698,463
MOLTEN PLASTIC EXTRUSION PROCESS

Yeates Conwell, Greenville, and Warren F. Busse and Vincent P. Caracciolo, Wilmington, Del., assignors to E. I. du Pont de Nemours & Company, Wilmington, Del., a corporation of Delaware Application November 3, 1951, Serial No. 254,754

9 Claims. (Cl. 18—55)

This invention relates to the extrusion of the solid polymers of ethylene in the form of filaments, films, threads, sheets, bands and other shapes, as well as the injection of such polymers in the presence of extrusion aiding means.

Many different types of processes are known for the extrusion of plastic materials. These processes include the extrusion of solutions and other types of plastic-containing compositions through spinnerets to form filaments, the extrusion of doughy plastic compositions and melts through extrusion slits to produce sheets, tubes, cylinders and other objects. High costs of materials and apparatus with overhead charges make it imperative that extrusion speeds be increased as high as quality of product and capacity of the equipment used will permit.

An object of the invention is to provide a process for the extrusion of the solid polymers of ethylene at a high rate. Another object is to provide melt drawing aids to permit rapid production of filaments, films, threads, sheets, bands and the like from the solid polymers of ethylene. Other objects and advantages of the invention will appear hereinafter.

The above and other objects are accomplished by the invention which, in its broadest aspects, comprises the extrusion of the solid polymers of ethylene while in the molten state into formed shapes, the polymer containing a drawing aid and preferably being surrounded during extrusion by an enclosed atmosphere. The drawing aids more specifically described hereinafter have been found capable, even though present in extremely low concentrations, of markedly improving the rate at which the molten polymer can be stretched after it is extruded. Moreover, the invention contemplates the use, with or without the drawing aid, of an enclosed environment in or through which the molten polymer is extruded.

Films from solid polymers of ethylene can be manufactured in many ways. A favored procedure in commercial practice is to extrude a comparatively thick film and then, while it is still plastic, pull it into a thin film by increasing the velocity or linear rate of film production.

The single figure diagrammatically illustrates in cross-sectional perspective one type of apparatus suitable for the extrusion of the solid polymers of ethylene from a melt into a thin film. Numeral 1 designates a hopper into which a molten, normally solid polymer of ethylene, at a temperature between 200 and 350° C., is supplied by means of the screw of a suitable extrusion device or other means known to the art, not shown. Hopper 1 is provided with a stationary blade 2 and an adjustable blade 3, adjustment being by means of thumb screws 4 threaded through lugs 5, the latter being secured to one wall of the hopper 1 on the opposite side of the fixed blade as shown. By this means blade 3 may be moved toward or away from blade 2 to adjust the width of the slit 6 through which the molten polymer is being forced. Tank 7 is positioned below the hopper and filled to the level shown with a suitable liquid for solidifying the polymer film 8 by cooling. A suitable gap is provided between the slit 6 and the surface of the cooling liquid. In this space the polymer, while still plastic, after extrusion from slit 6 is drawn down to the desired film thickness which may be from ½ to 1/100 of the setting of the slit 6. The thin film then enters the quench tank, which preferably is water although it may be any other suitable non-solvent cooling liquid. The film 8 passes into the fluid in the tank and around guide roll 9 from which the film is drawn by a pair of pick-up rolls, not shown, that provide a velocity sufficient to make the desired thickness of the film at the volume rate of extrusion under which the apparatus is being operated. At any predetermined extrusion condition of temperature, melt delivery, volume rate of extrusion, opening of slit, length of air gap, and width of the film an increase of the linear velocity will result in decreased thickness of the film. It is well known in the art that under such conditions a minimum thickness (or maximum linear velocity) is reached beyond which the film breaks. The invention is directed to means for increasing the maximum linear rate of extrusion (i. e. decreasing the minimum thickness of the film) at break.

One embodiment of the invention involves maintaining a closed atmosphere about the film during the time between its extrusion from slit 6 and its immersion in the fluid cooling bath. During this period it passes through the atmosphere provided in chamber 10. In this enclosed chamber a gas may be provided which can be air or any other suitable gas passed into the chamber 10 by conduit 11 and from the chamber through conduit 12. Suitable baffles, not shown, may be provided in chamber 10 to avoid direct impingement of gas stream on the film. The gas is preferably at a temperature above 100° C., usually in the range of 120 to 150° C.

The closed atmosphere about the extruded polymer prior to its solidification (whether the polymer is solidified and cooled in a liquid bath as shown or by slower cooling through a bath of vapors), not only increases the possible linear rate at which the extrusion can be carried out but also improves the quality of the extruded product. The reason for this improvement is not fully understood. Without the closed atmosphere about the orifice or slit through which the molten polymer is being extruded, small particles of polymer adhere to the edges of the orifice or slit causing streaks or scratches in the finished film. As a consequence, the linear rate at which it is possible to pull the molten polymer away from the orifice or slit without breakage is decreased from that obtainable with a closed atmosphere about the molten extruded polymer. The defects described are particularly noticeable upon starting up after a shut-down of the normal extrusion process, and the use of the closed atmosphere is advantageous in preventing this occurrence. When the closed atmosphere is provided around the lip of the orifice or slit and a comparatively quiescent inert atmosphere is maintained, the accumulation of polymer on the lip of the orifice or slit is minimized. When this closed atmosphere is provided, the vapors, which contain oils and waxes, given off during the extrusion process appear to lubricate the lip of the orifice or slit preventing the adhesion of particles of polymer, thus preventing the formation of streaks and scratches.

The drawing illustrates one type of apparatus that may be used in carrying out a preferred embodiment of the invention. A skilled engineer of this art will appreciate that similar apparatus may be provided for extruding the molten polymer from a spinnerette, slot or non-rectangular opening through a chamber of any suitable shape into a fluid bath of liquid or vapor, as shown, or through a tube or chamber of sufficient length to solidify the polymer prior to its withdrawal therefrom.

The improved products obtained by and the increased linear rate of draw permitted by the enclosed atmosphere about the freshly extruded polymer are further augmented if extrusion aids are added to the polymer prior to or during extrusion. These aids may be introduced into the polymer at any time prior to its extrusion, just before or during extrusion. For example, they may be mixed with the solid polymer prior to its heating to the melt stage or, for that matter, may be added just after the polymerization of the ethylene to form the normally solid polymers. Only small amounts are needed to give outstanding improvements in operation, as low as .001% by weight having been found to be effective while amounts above .02% appear to be undesirable. Generally speaking the aids should be present to the extent of from 0.001 to 0.02% and preferably between 0.005 and 0.01% by weight of the polymer.

The drawing aids that may be used include the well-known class of compounds known as ethylene polymer antioxidants, a number of which are described in the Strain et al. Patent 2,434,662. The most outsanding antioxidants for improving extrusion rates are the butylated hydroxy anisoles, such as are disclosed in the Rosenwald et al. Reissue Patent 23,239. These compounds when used as drawing aids, are used in amounts well below the amounts needed for the purpose of protecting the polymers from oxidation during the extrusion process, which is between about 0.1 to 5.0% by weight of the polymer. These amounts invariably produce objectionable odor during processing, increase friction and blocking or render the polymer colored and unsuitable for food wrapping purposes. Moreover, transparency of the film is excellent up to about 0.02% by weight of the preferred drawing aid, measured at temperatures of 250° C. and 300° C. Blocking, i. e. the tendency of the films to stick together on stacking, is slightly below 0.02% but increases to an undesirable extent above this percentage of the alkylated hydroxy anisole.

The advantageous results of the invention are illustrated by this example. Solid polymers of ethylene extruded from a temperature of 300° C. and containing no drawing aid, when extruded into water in an apparatus such as is illustrated by the drawing, and with air at a temperature between 120 and 150° C. circulating through the chamber 10, produced film at a linear rate of 10 to 15% over that with no enclosed atmosphere about the extruding film. With 0.005% butylated hydroxy anisole in the polymer, the linear rate of film production was increased an additional 30 to 60%.

In the table which follows three different batches of solid polymers of ethylene are compared with and without an antioxidant, films being formed by extrusion of the polymer from a #1 Royle extruder, at a rate of 64 grams/minute, and from a temperature of about 300° C. Extrusions in a chamber, such as is described in the drawing, with air and nitrogen in the chamber at a temperature between 120 and 150° C., are compared with extrusion with an open air gap between the slit of the hopper and the water bath.

*Table*

| Example | Butylated Hydroxyanisole, percent | Linear Take off rate, Ft. per minute | | |
|---|---|---|---|---|
| | | A | B | C |
| 1 | None | 150 | 167 | 140 |
| 2 | 0.001 | | 275 | 243 |
| 3 | 0.005 | 240 | 285 | 260 |
| 4 | None | 107 | 132 | 120 |
| 5 | 0.001 | 160 | 177 | 160 |
| 6 | None | 100 | 103 | |
| 7 | 0.0005 | 110 | 136 | |
| 8 | 0.001 | 122 | 138 | |
| 9 | 0.005 | 135 | 144 | 140 |

A—No chamber.
B—Air chamber.
C—N₂ chamber.

It is also within the scope of this invention to extrude the normally solid polymers of ethylene from melts with the extrusion aid or with the enclosed atmosphere or with both the aid and the atmosphere to give solid shapes and forms of comparatively large cross-sectional dimensions, although the optimum advantages of the invention are realized with objects of cross-sectional area having at least one small dimension.

We claim:
1. A process of producing extruded shapes of the normally solid polymers of ethylene which comprises extruding the polymers, and drawing them at a linear rate of draw greater than the polymer per se can be drawn at the same temperature, from a melt at a temperature between 200 and 350° C. and from a normally solid polymer of ethylene containing from 0.001 to 0.02% by weight of an ethylene polymer stabilizer and reducing at least one dimension of the extruded shape by drawing during extrusion.

2. The process of claim 1 in which the stabilizer is a butylated hydroxyanisole.

3. A process of producing extruded shapes of the normally solid polymers of ethylene which comprises extruding the polymers, and drawing them at a linear rate of draw greater than the polymer per se can be drawn at the same temperature, from a melt at a temperature between 200 and 350° C. and from a normally solid polymer of ethylene containing from 0.005 to 0.01% by weight of an ethylene polymer stabilizer, the shaped molten polymer as formed and while in the molten condition being extruded into a vapor out of direct contact with the atmosphere and reducing at least one dimension of the extruded shape by drawing during extrusion.

4. The process of claim 3 in which the stabilizer is a butylated hydroxyanisole.

5. A composition having superior extrudability comprising a solid polymer of ethylene containing from 0.001 to 0.02% of butylated hydroxyanisole by weight of ethylene polymer.

6. A composition having superior extrudability comprising a solid polymer of ethylene containing from 0.0005 to 0.02% of a butylated hydroxyanisole by weight of ethylene polymer.

7. A composition having superior extrudability comprising solid polymers of ethylene containing from 0.0005 to 0.02% of a 2-butylated hydroxyanisole.

8. In a process for the preparation of extruded shapes from the normally solid polymers of ethylene by passing molten polymers of ethylene through an orifice and thereafter drawing down the extruded polymer, the steps which comprise conducting the extrusion and drawing down operations from a melt at a temperature between 200 and 350° C. and from a normally solid polymer of ethylene containing from 0.0005 to 0.02% by weight of a butylated hydroxyanisole, and drawing them at a linear rate of draw greater than the polymer per se can be drawn at the same temperature.

9. In a process for the preparation of a normally solid polymer of ethylene film by passing molten polymer through a slit and thereafter drawing down the extruded thickness of the film, the steps which comprise extruding the polymer from a melt at a temperature between 200 and 350° C. and from a normally solid polymer of ethylene containing from 0.0005 to 0.02% by weight of ethylene polymer of a butylated hydroxyanisole, and drawing them at a linear rate of draw greater than the polymer per se can be drawn at the same temperature.

References Cited in the file of this patent

UNITED STATES PATENTS

| | | |
|---|---|---|
| Re. 23,239 | Rosenwald et al. | Feb. 8, 1943 |
| 2,339,452 | Bailey et al. | Jan. 18, 1944 |
| 2,367,173 | Martin | Jan. 9, 1945 |
| 2,401,642 | Hiltner | June 4, 1946 |